United States Patent
Dhaini

(10) Patent No.: US 10,427,563 B2
(45) Date of Patent: Oct. 1, 2019

(54) SEAT ASSEMBLY HAVING A PIVOT RESTRAINT MECHANISM THAT LIMITS SEAT BACK MOVEMENT

(71) Applicant: Lear Corporation, Southfield, MI (US)

(72) Inventor: Wissam Dhaini, Lapu-Lapu (PH)

(73) Assignee: Lear Corporation, Southfield, MI (US)

( * ) Notice: Subject to any disclaimer, the term of this patent is extended or adjusted under 35 U.S.C. 154(b) by 36 days.

(21) Appl. No.: 15/659,709

(22) Filed: Jul. 26, 2017

(65) Prior Publication Data

US 2019/0031056 A1     Jan. 31, 2019

(51) Int. Cl.
*B60N 2/20* (2006.01)
*B60N 2/42* (2006.01)
*B60N 2/90* (2018.01)
*A47C 1/16* (2006.01)

(52) U.S. Cl.
CPC ............ *B60N 2/4228* (2013.01); *B60N 2/20* (2013.01); *B60N 2/90* (2018.02); *A47C 1/16* (2013.01)

(58) Field of Classification Search
CPC .......... B60N 2/4228; B60N 2/90; B60N 2/20; A47C 1/16
USPC ..... 297/354.1, 310, 380, 378.11, 378.1, 381, 297/216.13, 216.14
See application file for complete search history.

(56) References Cited

U.S. PATENT DOCUMENTS

| | | | | |
|---|---|---|---|---|
| 5,295,729 A * | 3/1994 | Viano | ................... | B60N 2/4228 297/216.14 |
| 5,499,860 A * | 3/1996 | Smith | ...................... | A47D 1/02 297/183.5 |
| 6,012,769 A * | 1/2000 | Hsueh | ...................... | A47C 3/16 297/19 |
| 6,394,393 B1 * | 5/2002 | Mort | ...................... | B64D 11/06 244/122 R |
| 6,655,744 B2 | 12/2003 | Petri et al. | | |
| 6,991,286 B2 | 1/2006 | Nelson et al. | | |
| 8,132,863 B2 * | 3/2012 | Surgeon | ................... | B60N 2/265 297/473 |
| 2006/0220426 A1 * | 10/2006 | Moffatt | ............... | B60N 2/42736 297/216.19 |

FOREIGN PATENT DOCUMENTS

| | | |
|---|---|---|
| DE | 102008045999 A1 | 6/2009 |
| EP | 2631112 A1 | 8/2013 |
| WO | 02096722 A1 | 12/2002 |

\* cited by examiner

*Primary Examiner* — Syed A Islam
(74) *Attorney, Agent, or Firm* — Brooks Kushman P.C.

(57) ABSTRACT

A seat assembly having a seat bottom, a seat back, and at least one belt. The belt may have a first end that may be coupled to a seat bottom frame and a second end that may be coupled to a seat back frame. The belt may limit pivotal movement of the seat back away from the seat bottom.

20 Claims, 5 Drawing Sheets

SEAT ASSEMBLY HAVING A PIVOT RESTRAINT MECHANISM THAT LIMITS SEAT BACK MOVEMENT

TECHNICAL FIELD

This disclosure relates to a seat assembly having a pivot restraint mechanism that limits pivotal movement of a seat back.

BACKGROUND

A seat belt system for a vehicle seat is disclosed in U.S. Pat. No. 6,655,744.

SUMMARY

In at least one embodiment, a seat assembly is provided. The seat assembly may include a seat bottom, a seat back, and a belt. The seat bottom may have a seat bottom frame. The seat back may be pivotal about an axis with respect to the seat bottom. The seat back may have a seat back frame. The belt may have a first end and a second end. The first end may be coupled to the seat bottom frame. The second end may be coupled to the seat back frame. The belt may limit pivotal movement of the seat back about the axis and a rotational direction that extends away from the seat bottom.

In at least one embodiment, a seat assembly is provided. The seat assembly may include a seat bottom, a seat back, and a first belt. The seat bottom may include a seat bottom frame and a seat bottom trim cover. The seat bottom frame may have first and second lateral seat bottom side members that may extend along opposing lateral sides of the seat bottom. The seat bottom trim cover may cover the seat bottom frame. The seat back may be pivotally disposed on the seat bottom. The seat back may include a seat back frame and a seat back trim cover. The seat back frame may have first and second lateral seat back side members that extend along opposing lateral sides of the seat back. The seat back trim cover may cover the seat back frame. The first belt may extend from the seat bottom to the seat back. The first belt may have a first end and a second end that may be disposed opposite the first end. The first end may be coupled to the first lateral seat bottom side member. The second end may be coupled to the first lateral seat back side member. The first belt may be disposed between the seat bottom trim cover and an outboard side of the first lateral seat bottom side member that faces away from the second lateral seat bottom side member. The first belt may also be disposed between the first seat back trim cover and an outboard side of the first lateral seat back side member that faces away from the second lateral seat back side member.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
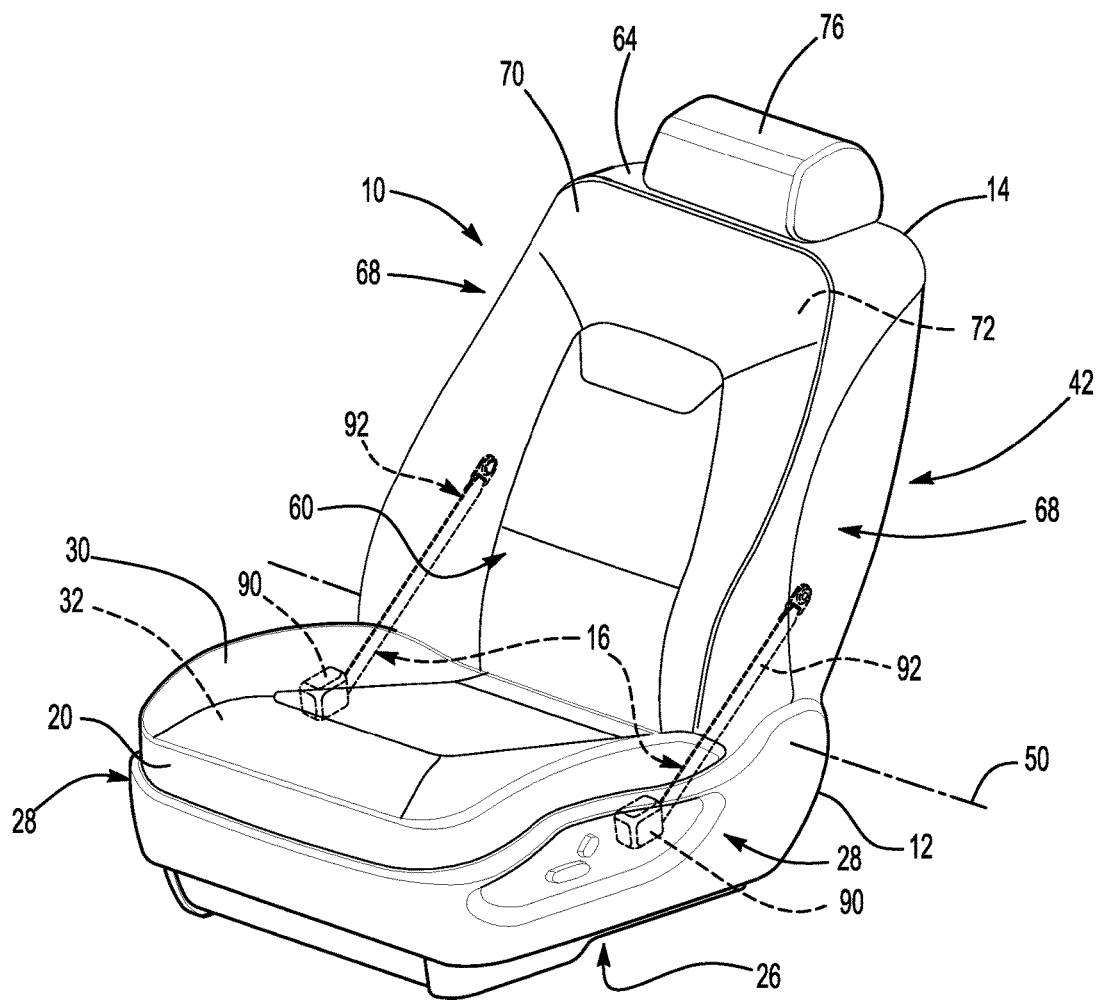
FIG. 1 it is a perspective view of a seat assembly.

Referring to FIG. 1, an example of a seat assembly 10 is shown. The seat assembly 10 may be configured for use in a motor vehicle, such as a car or truck. The seat assembly 10 may include a seat bottom 12, a seat back 14, and at least one pivot restraint mechanism 16.

Figure 3:
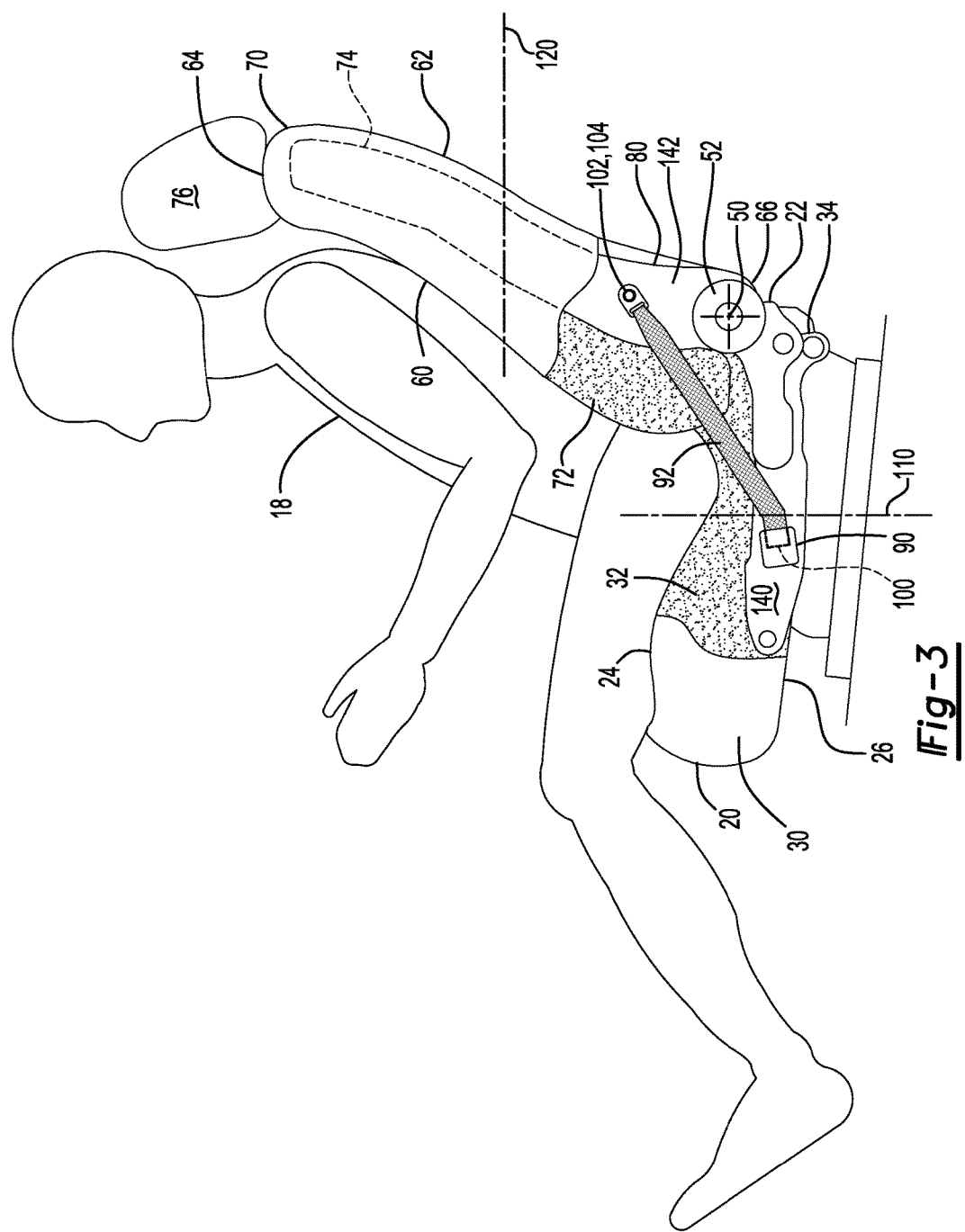
FIG. 3 is a fragmentary side view of the seat assembly of FIG. 1.

Referring to FIG. 3, the seat bottom 12 may be configured to support a seat occupant 18. The seat bottom 12 may be mounted to a support surface, such as a vehicle floor. For reference purposes, the side of the seat bottom 12 or side of components of the seat bottom 12 that faces in a forward direction or toward the front of the seat assembly 10 (e.g., to the left from the perspective shown in FIG. 3) may be referred to as a front side 20. A rear side 22 may be disposed opposite the front side 20 and may face to the right from the perspective shown in FIG. 3. A top side 24 may face toward a seat occupant 18. A bottom side 26 may be disposed opposite the top side 24. As is best shown in FIG. 1, opposing lateral sides 28 or left and right sides or sides may extend between the front side 20 and the rear side 22 and that may extend between the top side 24 and the bottom side 26.

Figure 2:
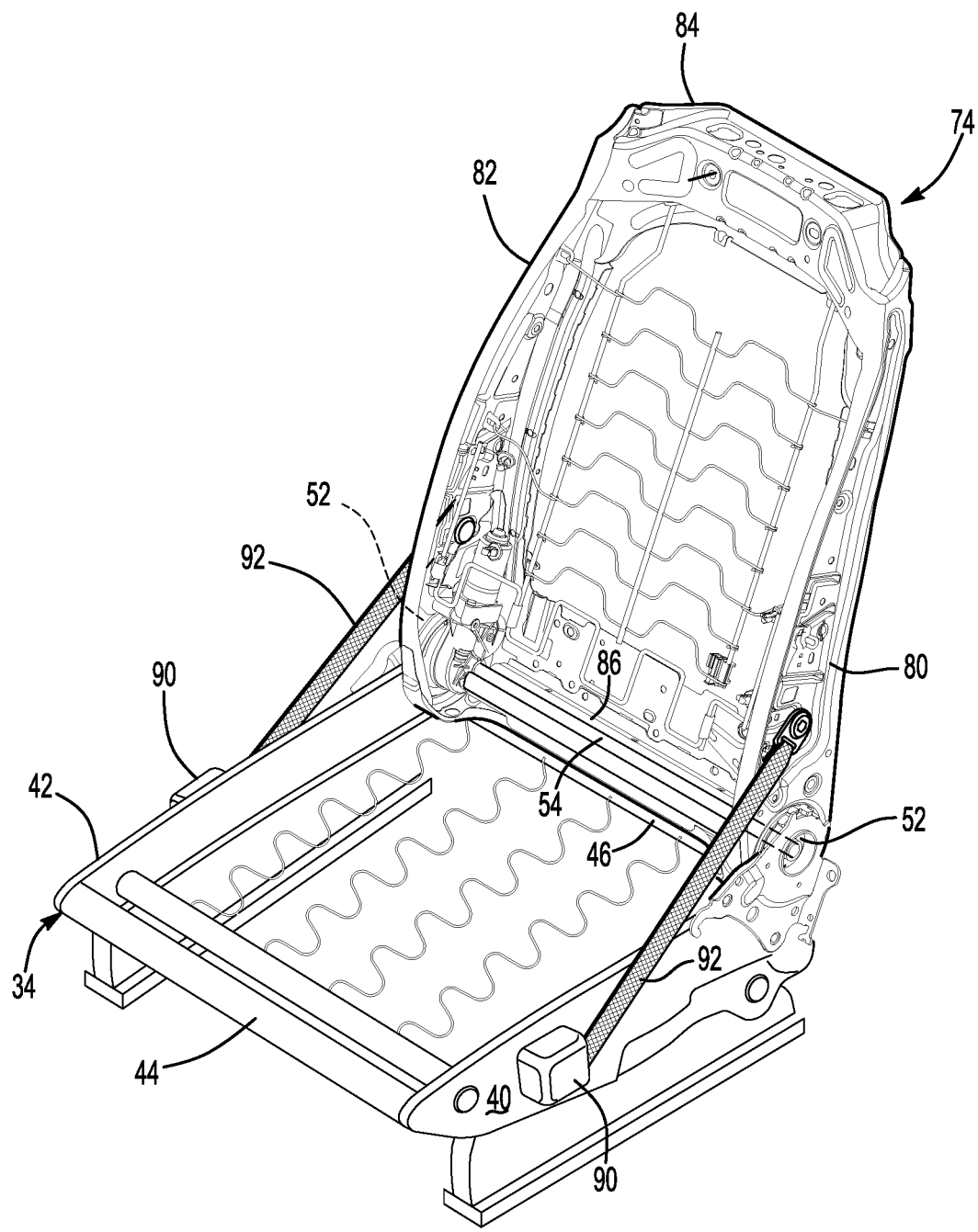
FIG. 2 is a perspective view of a portion of the seat assembly of FIG. 1 without trim covers and seat cushions.

As is best shown with reference to FIGS. 1 and 2, the seat bottom 12 may include seat bottom trim cover 30, a seat bottom cushion 32, and a seat bottom frame 34.

Referring to FIG. 1, seat bottom trim cover 30 may be disposed over or upon the seat bottom cushion 32 and may form or provide at least a portion of a visible exterior surface of the seat bottom 12. In addition, the seat bottom trim cover 30 may cover or conceal at least a portion of the seat bottom frame 34. A seat occupant 18 may be disposed on the seat bottom trim cover 30 when in a seated position. The seat bottom trim cover 30 may include a plurality of trim panels that may be assembled in any suitable manner, such as by stitching. In addition, the seat bottom trim cover 30 may be made of any suitable material or materials, such as fabric, leather, vinyl, carpet, or combinations thereof.

The seat bottom cushion 32 may be disposed between the seat bottom trim cover 30 and the seat bottom frame 34. For example, the seat bottom cushion 32 may be disposed on and may be supported by the seat bottom frame 34 and may be at least partially concealed by the seat bottom trim cover 30. The seat bottom cushion 32 may be made of any suitable material, such as foam.

Referring to FIG. 2, the seat bottom frame 34 may provide a load bearing structure for the seat bottom 12. In at least one configuration, the seat bottom frame 34 may include a first lateral seat bottom side member 40, a second lateral seat bottom side member 42, a front cross member 44, and a rear cross member 46.

The first lateral seat bottom side member 40 and the second lateral seat bottom side member 42 may be disposed along opposing lateral sides or left and right sides of the seat bottom frame 34. The first lateral seat bottom side member 40 and the second lateral seat bottom side member 42 may be spaced apart from each other and may extend generally parallel to each other. The first lateral seat bottom side member 40 and the second lateral seat bottom side member 42 may each include a rear end that may be disposed proximate the seat back 14 and a front end that may be disposed opposite the rear end. The first lateral seat bottom side member 40 and the second lateral seat bottom side member 42 may be integrally formed with the front cross member 44, the rear cross member 46, or both. Alternatively, the first lateral seat bottom side member 40 and the second lateral seat bottom side member 42 may be provided as separate components from the front cross member 44 and the rear cross member 46. A lateral seat bottom side member that is not integrally formed with a cross member may be attached to a cross member in any suitable manner, such as by welding or with fasteners.

The front cross member 44 may be generally disposed at the front of the seat bottom frame 34 and underneath the thigh region of the seat occupant 18. The front cross member 44 may extend from the front end of the first lateral seat bottom side member 40 to the front end of the second lateral seat bottom side member 42. The front cross member 44 may be disposed substantially perpendicular to the first lateral seat bottom side member 40 and the second lateral seat bottom side member 42 in one or more configurations.

The rear cross member 46 may be disposed at or near the rear of the seat bottom frame 34 and below the seat back 14. In addition, the rear cross member 46 may be disposed substantially parallel to the front cross member 44 in one or more configurations. The rear cross member 46 may be fixedly attached to the first lateral seat bottom side member 40 to the second lateral seat bottom side member 42. For example, the rear cross member 46 may extend from the rear end of the first lateral seat bottom side member 40 to the rear end of the second lateral seat bottom side member 42.

Referring to FIGS. 1-3, the seat back 14 may be configured to support the back of a seat occupant 18. The seat back 14 may be pivotal about an axis 50 with respect to the seat bottom 12. For example, a pair of recliner mechanisms 52 may pivotally connect the seat back 14 to the seat bottom 12 as is best shown in FIGS. 2 and 3. As is best shown in FIG. 2, a synchronization rod 54 may extend along the axis 50 between the recliner mechanisms 52 to synchronize operation of the recliner mechanisms 52 in a manner known by those skilled in the art.

Referring to FIG. 1, for reference purposes the side of the seat back 14 or side of components of the seat back 14 that face in a forward direction or toward the front of the seat assembly 10 or toward a seat occupant 18 may be referred to at a front side 60. A back side 62 may be disposed opposite the front side 60. An upper side 64 may be disposed adjacent to and below a headrest that is located at the top of the seat back 14. The lower side 66 may be disposed opposite the upper side 64. The left and right sides or sides that may extend between the front side 60 and the back side 62 and that may extend between the upper side 64 and the lower side 66 may be referred to as lateral sides 68.

As is best shown with reference to FIGS. 1 and 2, the seat back 14 may include seat back trim cover 70, a seat back cushion 72, a seat back frame 74, and a headrest 76 or head restraint.

Referring to FIG. 1, the seat back trim cover 70 may be disposed over or upon the seat back cushion 72 and may form or provide at least a portion of a visible exterior surface of the seat back 14. In addition, the seat back trim cover 70 may cover or conceal at least a portion of the seat back frame 74. A seat occupant 18 may be disposed on the seat back trim cover 70 when in a seated position. The seat back trim cover 70 may include a plurality of trim panels that may be assembled in any suitable manner, such as by stitching. In addition, the seat back trim cover 70 may be made of any suitable material or materials, such as fabric, leather, vinyl, carpet, or combinations thereof.

The seat back cushion 72 may be disposed between the seat back trim cover 70 and the seat back frame 74. For example, the seat back cushion 72 may be disposed on and may be supported by the seat back frame 74 and may be at least partially concealed by the seat back trim cover 70. The seat back cushion 72 may be made of any suitable material, such as foam.

The seat back cushion 72 may be disposed between the seat back trim cover 70 and the seat back frame 74. For example, the seat back cushion 72 may be disposed on a front side of the seat back 14 with respect to the seat back frame 74 and may be at least partially concealed by the seat back trim cover 70. The seat back cushion 72 may be made of any suitable material, such as foam.

Referring to FIG. 2, the seat back frame 74 may provide a load bearing structure for the seat back 14. In at least one configuration, the seat back frame 74 may include a first lateral seat back side member 80, a second lateral seat back side member 82, an upper cross member 84, and a lower cross member 86.

The first lateral seat back side member 80 and the second lateral seat back side member 82 may be spaced apart from each other and may generally extend away from the seat bottom 12 along opposing lateral sides of the seat back 14. The first lateral seat back side member 80 and the second lateral seat back side member 82 may be disposed substantially parallel to each other. In addition, the first lateral seat back side member 80 and the second lateral seat back side member 82 may extend from the lower cross member 86 to the upper cross member 84. The first lateral seat back side member 80 and the second lateral seat back side member 82 may be integrally formed with the upper cross member 84, the lower cross member 86, or both. Alternatively, the first lateral seat back side member 80 and the second lateral seat back side member 82 may be provided as separate components from the upper cross member 84 and the lower cross member 86. A lateral seat back side member that is not integrally formed with a cross member may be attached to a cross member in any suitable manner, such as by welding or with fasteners.

The upper cross member 84 may be disposed proximate the upper side 64 of the seat back 14. The upper cross member 84 may extend from the first lateral seat back side member 80 to the second lateral seat back side member 82 and may extend in a generally horizontal direction.

The lower cross member 86 may be disposed proximate the lower side 66 of the seat back 14 and may be disposed above the seat bottom 12. The lower cross member 86 may be disposed opposite the upper cross member 84 and extend from the first lateral seat back side member 80 to the second lateral seat back side member 82. As such, the lower cross member 86 may extend in a generally horizontal direction.

Referring to FIGS. 1-3, at least one pivot restraint mechanism 16 may be provided with the seat assembly 10. The pivot restraint mechanism 16 may limit pivotal movement or rotation of the seat back 14 in a rearward direction about the axis 50 with respect to the seat bottom 12 as will be discussed in more detail below. In the configuration shown, two pivot restraint mechanisms 16 are provided and are located along opposing lateral sides of the seat assembly 10. In at least one configuration, the pivot restraint mechanism 16 may include a pretensioner 90 and a belt 92.

Figure 4:
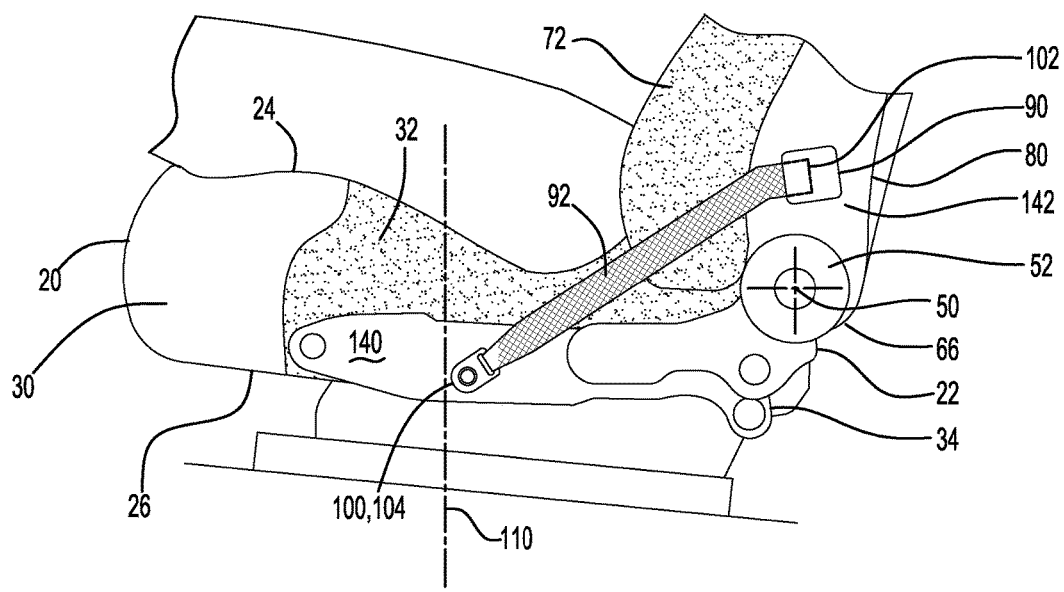
FIGS. 4 and 5 are fragmentary side view of additional configurations of the seat assembly.

The pretensioner 90 may facilitate coupling of the belt 92 to either the seat bottom frame 34 or the seat back frame 74. For example, one end of the belt 92 may be coupled to a portion of the pretensioner 90, such as a rotatable spool, and the pretensioner 90 may be coupled to either the seat bottom frame 34 or the seat back frame 74. In the configuration shown in FIGS. 1-3, the pretensioner 90 is mounted to the seat bottom frame 34. In such a configuration, a pretensioner 90 may be mounted on the first lateral seat bottom side member 40, the second lateral seat bottom side member 42, or both. In the configuration shown in FIG. 4, the pretensioner 90 is mounted on the seat back frame 74. In such a configuration, a pretensioner 90 may be mounted on the first lateral seat back side member 80, the second lateral seat back side member 82, or both.

The pretensioner 90 may be operative to retract the belt 92 and/or lock to inhibit unwinding of the belt 92 from the pretensioner 90. For example, the pretensioner 90 may operate to tighten the belt 92 and remove slack, such as by winding the belt 92 onto a spool. The pretensioner 90 may be of any suitable type. For instance, the pretensioner 90 may be the same type that commercially available for use with occupant seat belts. In addition, the pretensioner 90 may be an electric pretensioner or a pyrotechnic pretensioner that may employ a pyrotechnic charge or explosively expanding gas to drive a piston that may retract the belt 92. The pretensioner 90 may be triggered by one or more sensors on the vehicle as is known by those skilled in the art.

The belt 92 may extend from the pretensioner 90 and may extend between the seat bottom 12 and the seat back 14. The belt 92 may have any suitable configuration. For example, the belt 92 may be made of the same material and weave as a seat belt. However, the belt 92 may not restrain a seat occupant 18 and therefore may be spaced apart from and may not engage the seat occupant 18. In at least one configuration, the belt 92 may have a first end 100 and a second end 102.

The first end 100 may be an end of the belt 92 that is coupled to the seat bottom frame 34. For example, the first end 100 of the belt 92 of one pivot restraint mechanism 16 may be coupled to the first lateral seat bottom side member 40 while the first end 100 of the belt 92 of another pivot restraint mechanism 16 may be coupled to the second lateral seat bottom side member 42. In the configuration shown in FIGS. 1-3, the first end 100 of each belt 92 may be coupled to the seat bottom frame 34 via a corresponding pretensioner 90. In the configuration shown in FIG. 4, the first end 100 may be a free end that is disposed opposite the pretensioner 90 and may have a mounting feature 104, such as a buckle or mounting plate, that is coupled to a lateral seat bottom side member via a fastener, such as a mating buckle portion or bolt. The first end 100 of the belt 92 may be coupled to the seat bottom frame 34 below the axis 50 and forward of a seat bottom center line 110. The seat bottom center line 110 may be disposed midway between the front side 20 of the seat bottom 12 and the rear side 22 of the seat bottom 12. The seat bottom center line 110 may be disposed in a plane that may extend in a generally vertical direction.

The second end 102 may be disposed opposite the first end 100 and may be coupled to the seat back frame 74. For example, the second end 102 of the belt 92 of one pivot restraint mechanism 16 may be coupled to the first lateral seat back side member 80 while the second end 102 of the belt 92 of another pivot restraint mechanism 16 may be coupled to the second lateral seat back side member 82. In the configuration shown in FIGS. 1-3, the second end 102 is a free end that is disposed opposite the pretensioner 90 and may have a mounting feature 104. In the configuration shown in FIG. 4, the first end 100 of each belt 92 may be coupled to the seat back frame 74 via a corresponding pretensioner 90. The second end 102 of the belt 92 may be coupled to the seat back frame 74 above the axis 50 and below the upper side 64 of the seat back 14. For example, the second end 102 of the belt 92 may be coupled to the seat back frame 74 above the axis 50 and below a seat back center line 120. The seat back center line 120 may be disposed midway between the upper side 64 and the lower side 66 of the of the seat back 14. The seat back center line 120 may be disposed in a plane that may extend in a generally horizontal direction.

The belts 92 may be disposed completely inside the seat assembly 10 or primarily inside of the seat assembly 10. For example, the seat bottom trim cover 30 and the seat back trim cover 70 may cooperate to completely cover or conceal the belt 92.

Figure 7:
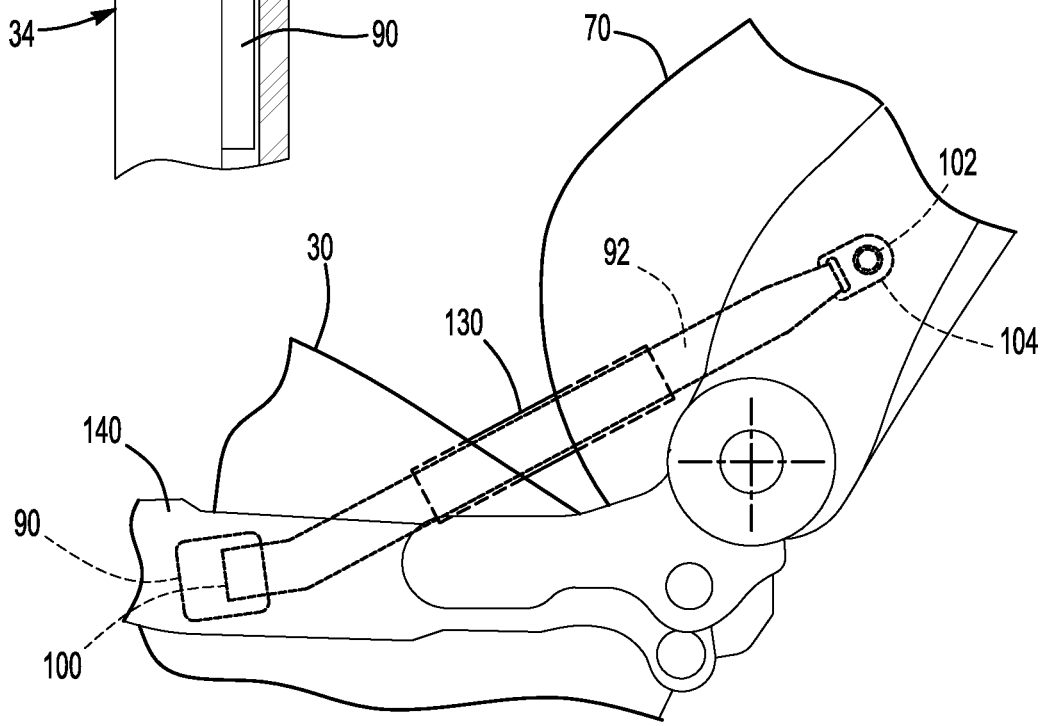
FIG. 7 is a side view of a portion of a seat assembly having a sleeve.

Referring to FIG. 7, a sleeve 130 may be provided with the seat bottom trim cover 30 and/or the seat back trim cover 70 to receive and further conceal the belt 92. The sleeve 130 may be provided where the belt 92 passes through the seat bottom trim cover 30 and the seat back trim cover 70. The sleeve 130 may extend from the seat bottom trim cover 30 to the seat back trim cover 70 and may conceal the belt 92 when the seat back 14 is reclined away from the seat bottom 12 to an extent where the seat back trim cover 70 disengages the seat bottom trim cover 30 where the belt 92 exits the seat bottom trim cover 30 and the seat back trim cover 70. The sleeve 130 may stretch or expand to conceal the belt 92 throughout the full range of reclining motion of the seat back 14. For example, the sleeve 130 may be a flexible material, such as a fabric or film, that may accommodate movement of the belt 92 or may be a rigid or semi rigid material, such as a polymeric material.

Referring to FIGS. 1-3, the belts 92 may be disposed outboard of the lateral seat bottom side members. For example, one belt 92 may be disposed between the seat bottom trim cover 30 and an outboard side 140 of the first lateral seat bottom side member 40. The outboard side 140 of the first lateral seat bottom side member 40 may face away from the center of the seat bottom 12 and away from the second lateral seat bottom side member 42. Another belt 92 may be disposed between the seat bottom trim cover 30 and an outboard side 140 of the second lateral seat bottom side member 42. The outboard side 140 of the second lateral seat bottom side member 42 may face away from the center of the seat bottom 12 and away from the first lateral seat bottom side member 40.

In a similar manner, the belts 92 may be disposed outboard of the lateral seat back side members. For example, one belt 92 may be disposed between the seat back trim cover 70 and an outboard side 142 of the first lateral seat back side member 80. The outboard side 140 of the first lateral seat back side member 80 may face away from the center of the seat back 14 and away from the second lateral seat back side member 82. Another belt 92 may be disposed between the seat back trim cover 70 and an outboard side 142 of the second lateral seat back side member 82. The outboard side 142 of the second lateral seat back side member 82 may face away from the center of the seat back 14 and away from the first lateral seat back side member 80.

The belts 92 may be located in various positions between the seat bottom frame 34 and the seat bottom trim cover 30 and between the seat back frame 74 and the seat back trim cover 70. For instance, the belts 92 may be primarily or completely disposed outboard of the side members of the seat bottom frame 34 and/or the seat back frame 74.

Figure 6:
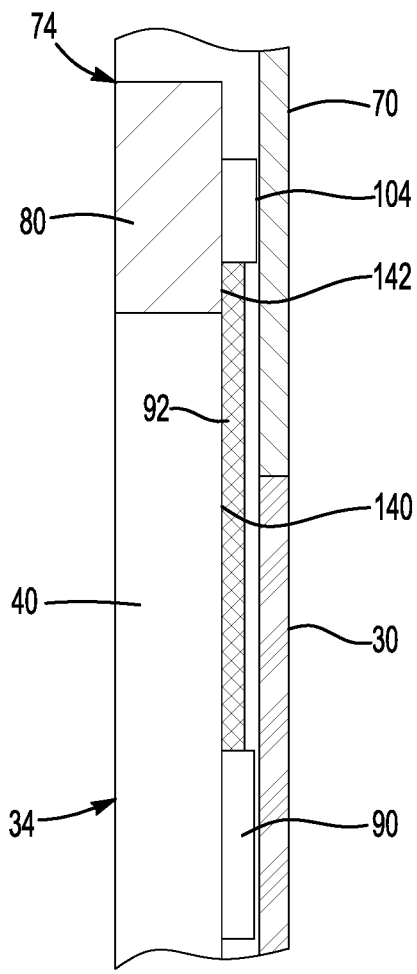
FIG. 6 is a top section view of a portion of the seat assembly of FIG. 1.

Referring to FIG. 6, the belts may extend along the seat bottom frame 34 and the seat back frame 74. For instance, a belt 92 may be located under the seat bottom trim cover 30 and may be disposed proximate and may engage the first lateral seat bottom side member 40 and/or the second lateral seat bottom side member 42. Similarly, a belt 92 may be located under the seat back trim cover 70 and may be disposed proximate and may engage the first lateral seat back side member 80 and/or the second lateral seat back side member 82. The belt 92 may engage the seat bottom trim cover 30 and the seat back trim cover 70. In such a configuration, the seat bottom trim cover 30 and/or the seat back trim cover 70 may include additional material or padding on a surface that faces the belt 92 to help mask the location of the belt 92 to provide an improved aesthetic appearance.

Referring to FIG. 3, the belts 92 may also extend along a lateral side of the seat bottom cushion 32 and the seat back cushion 72. For instance, a belt 92 may be disposed under the seat bottom trim cover 30 and may be positioned between the seat bottom trim cover 30 and a lateral side of the seat bottom cushion 32 and may be disposed under the seat back trim cover 70 and may be positioned between the seat back trim cover 70 and a lateral side of the seat back cushion 72.

Figure 5:
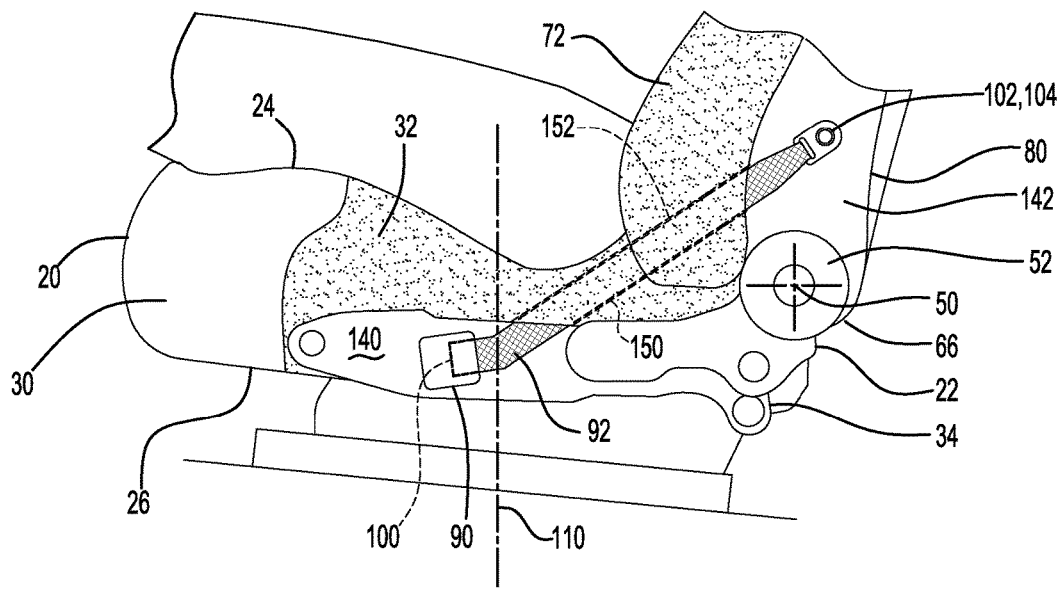

Referring to FIG. 5, the belts 92 may also extend through the seat bottom cushion 32 and/or the seat back cushion 72. For instance, a belt 92 may be disposed under the seat bottom trim cover 30 and may extend through a slit 150 in the seat bottom cushion 32 and may be disposed under the seat back trim cover 70 and may extend through a slit 152 in the seat back cushion 72.

The slits 150, 152 may be sized to provide adequate space for the belt 92 to move when the seat back 14 is folded over the seat bottom 12 or fully reclined away from the seat bottom 12. In addition, it is contemplated that the sleeve 130 may extend into one or both slits 150, 152 to prevent or inhibit the belt 92 from cutting or tearing the seat bottom cushion 32 and/or the seat back cushion 72. It is also contemplated that separate sleeves may be provided in the seat bottom cushion 32 and the seat back cushion 72 such that the sleeves do not extend between the seat bottom trim cover 30 and the seat back trim cover 70.

The pivot restraint mechanisms 16 may limit pivotal movement of the seat back 14 away from the seat bottom 12. For instance, the pivot restraint mechanisms 16 may limit rotation of the seat back 14 about the axis 50 and away from the seat bottom 12 in response to a rear vehicle impact event. A seat occupant 18 may exert increased rearward force on the seat back 14 in response to a rear vehicle impact event. The pivot restraint mechanisms 16 may supplement the counteracting force exerted by the recliner mechanisms 52 to reduce rearward rotation of the seat back 14.

One or more sensors may be provided with the vehicle that may detect a rear impact event in a manner known by those skilled in the art. The pretensioners 90 may be activated in response to the detection of a rear vehicle impact event to retract corresponding belts 92, thereby providing increased tensile force on the belts 92. The increased tensile force may help limit or prevent rotation of the seat back 14 away from the seat bottom 12. Angular rotation of the seat back 14 about the axis 50 may decrease as the tensile force exerted by the pretensioners 90 increases. As an example, a seat assembly may be configured to allow rearward angular rotation of approximately 32° when not equipped with pivot restraint mechanisms. Equipping the same seat assembly with pivot restraint mechanisms 16 may reduce rearward angular rotation of the seat back 14. Providing a tensile force of 2500 N with the pivot restraint mechanisms may limit rearward angular rotation to approximately 24°, a tensile force of 4500 N may limit angular rotation to approximately 21°, and a tensile force of 8500 N may limit angular rotation to approximately 16°. As such, the amount of force that is exerted by the pretensioners 90 may be set to limit the rearward rotation of the seat back 14 about the axis 50.

The pivot restraint mechanisms 16 may also reduce peak moment forces exerted on the recliner mechanisms 52. The moment forces on the recliner mechanisms 52 may initially be negative (e.g., the pretensioners 90 may exert force that may bias seat back forward) when the pretensioners 90 are activated, which may reduce the peak moment forces exerted on the recliner mechanisms 52 as compared to a seat assembly that is not provided with pivot restraint mechanisms, which may help improve the capability of the seat assembly 10 to withstand impact forces.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
   a seat bottom having a seat bottom frame and a seat bottom trim cover that covers the seat bottom frame;
   a seat back that is pivotal about an axis with respect to the seat bottom, the seat back having a seat back frame and a seat back trim cover that covers the seat back frame; and
   a belt that has a first end that is coupled to the seat bottom frame and a second end that is coupled to the seat back frame, wherein the belt limits pivotal movement of the seat back about the axis away from the seat bottom, wherein the belt is disposed completely inside the seat assembly such that the seat back trim cover and seat bottom trim cover completely cover the belt; and
   a sleeve that is provided with the seat back trim cover, the seat bottom trim cover, or the seat back trim cover and the seat bottom trim cover and the belt is received in the sleeve.

2. The seat assembly of claim 1 wherein the belt is coupled to the seat bottom frame with a pretensioner that is operative to retract the belt to limit pivotal movement of the seat back away from the seat bottom.

3. The seat assembly of claim 1 wherein the belt is coupled to the seat back frame with a pretensioner that is operative to retract the belt to limit pivotal movement of the seat back away from the seat bottom.

4. The seat assembly of claim 1 wherein the belt is coupled to the seat back above the axis and below an upper side of the seat back.

5. The seat assembly of claim 4 wherein the belt is coupled to the seat back frame above the axis and below a seat back center line of the seat back that is disposed midway between the upper side and a lower side of the seat back that is disposed opposite the upper side.

6. The seat assembly of claim 5 wherein the belt is coupled to the seat bottom frame below the axis and forward of a seat bottom center line of the seat bottom that is disposed midway between a front side of the seat bottom and a rear side of the seat bottom that is disposed opposite the front side.

7. The seat assembly of claim 1 wherein the belt is spaced apart from and does not engage a seat occupant.

8. A seat assembly comprising:
a seat bottom that includes:
a seat bottom frame having first and second lateral seat bottom side members that extend along opposing lateral sides of the seat bottom; and
a seat bottom trim cover that covers the seat bottom frame;
a seat back that is pivotally disposed on the seat bottom, the seat back including:
a seat back frame having first and second lateral seat back side members that extend along opposing lateral sides of the seat back; and
a seat back trim cover that covers the seat back frame;
a first belt that extends from the seat bottom to the seat back, wherein the first belt has a first end that is coupled to the first lateral seat bottom side member and a second end that is disposed opposite the first end and is coupled to the first lateral seat back side member, wherein the first belt is disposed between the seat bottom trim cover and an outboard side of the first lateral seat bottom side member that faces away from the second lateral seat bottom side member and is disposed between the seat back trim cover and an outboard side of the first lateral seat back side member that faces away from the second lateral seat back side member; and
a sleeve that is provided with the seat back trim cover, the seat bottom trim cover, or the seat back trim cover and the seat bottom trim cover and the first belt is received in the sleeve.

9. The seat assembly of claim 8 wherein the first belt limits pivotal movement of the seat back away from the seat bottom in response to a rear impact event.

10. The seat assembly of claim 8 wherein the first belt is disposed on the first lateral seat back side member.

11. The seat assembly of claim 8 wherein the seat back further comprises a seat back cushion that is disposed on the seat back frame, wherein the seat back trim cover covers the seat back cushion and the first belt is disposed between the seat back trim cover and the seat back cushion.

12. The seat assembly of claim 8 wherein the seat back further comprises a seat back cushion that is disposed on the seat back frame, wherein the first belt extends through the seat back cushion.

13. The seat assembly of claim 8 wherein the first belt is disposed on the first lateral seat bottom side member.

14. The seat assembly of claim 1 wherein the sleeve extends from the seat back trim cover to the seat bottom trim cover.

15. The seat assembly of claim 8 wherein the seat bottom further comprises a seat bottom cushion that is disposed on the seat bottom frame, wherein the seat bottom trim cover covers the seat bottom cushion and the first belt is disposed between the seat bottom trim cover and the seat bottom cushion.

16. The seat assembly of claim 8 wherein the seat bottom further comprises a seat bottom cushion that is disposed on the seat bottom frame, Wherein the first belt extends through the seat bottom cushion.

17. The seat assembly of claim 8 further comprising a second belt that extends from the seat bottom to the seat back, wherein the second belt has a first end that is coupled to the second lateral seat bottom side member and a second end that is disposed opposite the first end and is coupled to the second lateral seat back side member, wherein the second belt is disposed between the seat bottom trim cover and an outboard side of the second lateral seat bottom side member that laces away from the first lateral seat bottom side member.

18. The seat assembly of claim 17 wherein the second belt is disposed between the seat back trim cover and an outboard side of the second lateral seat back side member that faces away from the first lateral seat back side member.

19. The seat assembly of claim 18 wherein the first belt and the second belt are completely disposed outboard of the seat back frame.

20. The seat assembly of claim 18 wherein the first belt and the second belt are coupled to the seat bottom frame with first and second pretensioners, respectively, that are operative to retract the first and second belts, respectively, to limit pivotal movement of the seat back away from the seat bottom.

* * * * *

UNITED STATES PATENT AND TRADEMARK OFFICE
CERTIFICATE OF CORRECTION

| | |
|---|---|
| PATENT NO. | : 10,427,563 B2 |
| APPLICATION NO. | : 15/659709 |
| DATED | : October 1, 2019 |
| INVENTOR(S) | : Wissam Dhaini et al. |

It is certified that error appears in the above-identified patent and that said Letters Patent is hereby corrected as shown below:

In the Claims

Column 10, Line 28, Claim 17:
After "member that"
Delete "laces" and
Insert -- faces --.

Signed and Sealed this
Fourteenth Day of April, 2020

Andrei Iancu
*Director of the United States Patent and Trademark Office*